(12) United States Patent
Li et al.

(10) Patent No.: US 11,440,996 B2
(45) Date of Patent: Sep. 13, 2022

(54) PREPARATION METHOD OF POLYPHENYLENE SULFIDE RESIN, AND POLYPHENYLENE SULFIDE RESIN PREPARED THEREBY

(71) Applicants: ZHEJIANG NHU COMPANY LTD., Zhejiang (CN); ZHEJIANG UNIVERSITY, Zhejiang (CN); ZHEJIANG NHU SPECIAL MATERIALS CO., LTD., Zhejiang (CN)

(72) Inventors: Woyuan Li, Zhejiang (CN); Hong Yin, Zhejiang (CN); Zhirong Chen, Zhejiang (CN); Baishan Hu, Zhejiang (CN); Guiyang Zhou, Zhejiang (CN); Hangjun Deng, Zhejiang (CN); Ming Lian, Zhejiang (CN); Xiongwei Zhang, Zhejiang (CN); Qichuan Li, Zhejiang (CN); Jiang Zhao, Zhejiang (CN)

(73) Assignees: ZHEJIANG NHU CO., LTD., Shaoxing (CN); ZHEJIANG UNIVERSITY, Zhejiang (CN); ZHEJIANG NHU SPECIAL MATERIALS CO., LTD., Zheijang (CN)

( * ) Notice: Subject to any disclaimer, the term of this patent is extended or adjusted under 35 U.S.C. 154(b) by 0 days.

(21) Appl. No.: 16/957,934

(22) PCT Filed: Jul. 12, 2018

(86) PCT No.: PCT/CN2018/095465
§ 371 (c)(1),
(2) Date: Jun. 25, 2020

(87) PCT Pub. No.: WO2019/128189
PCT Pub. Date: Jul. 4, 2019

(65) Prior Publication Data
US 2020/0347186 A1   Nov. 5, 2020

(30) Foreign Application Priority Data

Dec. 27, 2017 (CN) .......................... 201711444565.9

(51) Int. Cl.
| | | |
|---|---|---|
| C08G 75/0254 | (2016.01) | |
| C08G 75/0213 | (2016.01) | |
| C08G 75/029 | (2016.01) | |

(52) U.S. Cl.
CPC ....... *C08G 75/0254* (2013.01); *C08G 75/029* (2013.01); *C08G 75/0213* (2013.01)

(58) Field of Classification Search
CPC  C08G 75/23; C08G 75/0213; C08G 75/0254; C08G 75/029; C08G 2261/3444; C08L 81/06
See application file for complete search history.

(56) References Cited

U.S. PATENT DOCUMENTS

| | | | |
|---|---|---|---|
| 3,601,199 A | 8/1971 | Rotvand | |
| 5,741,933 A * | 4/1998 | Goda | C07C 319/06 568/62 |
| 6,172,179 B1 | 1/2001 | Zook et al. | |
| 2006/0122363 A1* | 6/2006 | Hayashi | C08G 75/0254 528/373 |
| 2019/0040202 A1* | 2/2019 | Ho | C07C 315/02 |

FOREIGN PATENT DOCUMENTS

| | | |
|---|---|---|
| CN | 103897187 A | 7/2014 |
| CN | 106633062 A | 5/2017 |
| CN | 107207727 A | 9/2017 |
| JP | 2004123958 A | 4/2004 |
| JP | 2013010908 A | 1/2013 |

* cited by examiner

*Primary Examiner* — Shane Fang
(74) *Attorney, Agent, or Firm* — Young Basile Hanlon & MacFarlane, P.C.

(57) ABSTRACT

A preparation method of a polyphenylene sulfide resin, and a polyphenylene sulfide resin prepared by the method using a sulfur-containing compound, an alkaline substance and p-dichlorobenzene as raw materials, a fatty acid as a polycondensation aid to carry out a polycondensation reaction. After purification treatment, a primary polyphenylene sulfide is obtained, which then reacts with a terminal-group adjusting agent at a high temperature to generate the polyphenylene sulfide resin resulting in high yield and low cost. The prepared polyphenylene sulfide resin has high reactivity, high melting crystallization temperature and excellent thermal stability. The resulting polyphenylene sulfide resin can be directly used for extrusion and injection molding.

20 Claims, No Drawings

PREPARATION METHOD OF POLYPHENYLENE SULFIDE RESIN, AND POLYPHENYLENE SULFIDE RESIN PREPARED THEREBY

This application is a National Stage Entry under 35 U.S.C. 371 of PCT/CN2018/095465 which claims priority from CN 201711444565.9 filed Dec. 27, 2017. The entire contents of these applications are incorporated herein by reference in their entirety.

TECHNICAL FIELD AND PRIORITY

The disclosure pertains to the field of polymer materials, relates to a polyphenylene sulfide resin having high reactivity, high melting crystallization temperature and high thermal stability, and relates to a preparation method and application of the polyphenylene sulfide resin.

BACKGROUND

Polyphenylene Sulfide (PPS) is an engineering plastic excellent in heat resistance, chemical resistance, flame retardancy, mechanical strength, electrical properties, dimensional stability, and the like. Since PPS can be molded into various molded articles, films, sheets, fibers, and the like by general melt processing methods such as extrusion molding, injection molding, or compression molding, PPS is widely used in fields such as electronic and electrical equipment, automobile equipment, and so on.

Unmodified polyphenylene sulfide has medium strength. After strengthening and modification, polyphenylene sulfide has excellent strength and rigidity, and becomes an engineering plastic with excellent overall performance. Modification of polyphenylene sulfide resin can be made according to the disadvantages of polyphenylene sulfide, to enhance or improve the performance of polyphenylene sulfide. For example, the following disadvantages of polyphenylene sulfide must be overcome by modification.

1) Large brittleness and low elongation. According to the chemical structure of polyphenylene sulfide, its molecular chain is rigid and its maximum crystallinity can reach 70%, so its toughness is poor, and its welding strength is not good, which limits the use of polyphenylene sulfide as an impact resistant part.

2) High cost. The price is about 1 to 2 times higher than general engineering plastics 3) Non-ideal paintability and colorability. Because polyphenylene sulfide has excellent chemical resistance, its paintability and colorability are poor.

4) High melting point. During the melting process, polyphenylene sulfide is susceptible to thermal oxidation cross-linking reaction with oxygen in the air, resulting in reduced fluidity.

Therefore, in actual use, polyphenylene sulfide needs to be blended and modified with inorganic fillers or organic fillers, reinforcing fibers and other polymer materials to produce various polyphenylene sulfide composite materials or special engineering plastics with better performance, which not only greatly improves the performance of polyphenylene sulfide and overcomes its shortcomings, but also realizes economic use.

The key to the design of the resin modification formula is the four elements of material selection, matching, dosage and mixing. However, the final modification formula should have processability to ensure the molding of the product and have no adverse effects on processing equipment and the use environment. For the processing performance of the modification formula, the most important thing is the control of fluidity. The fluidity will affect the degree of mixing of the resin and the filler, and then affect the uniformity of the composite material. If the fluidity is too poor or too good, the resulting composite material cannot be processed and applied by a melt processing method of injection molding or extrusion molding. Besides, the crystallinity of the composite material is usually an indicator that is focused on in downstream applications. The crystallinity of the material is usually characterized by melt crystallization temperature. The composite material has high melt crystallization temperature and rapid crystallization rate, the cooling and crystallization time of the composite material in the mold is short, and the number of parts produced per unit time is large, so the factory production capacity can be increased.

In the modification formula, in order to increase the adhesion between the polymer resin and the inorganic filler or organic filler, the inorganic filler added to the polymer is generally subjected to surface treatment, or a modification aid is added during the modification process, and a coupling agent is the most commonly used surface modifier and modification aid.

The coupling agents are important treatment agents used in increasingly wide fields, and are mainly used as aids for polymer composite materials. Among them, silane coupling agents are the earliest and most widely used coupling agents and have more than 60 years of development history so far. With the application of silane coupling agents in glass fiber reinforced fillers, the synthesis of a series of new silane coupling agents has been promoted. Due to their unique properties and significant modification effects, the application range of silane coupling agents is increasingly expanded. The silane coupling agents are applicable to the surface modification of all inorganic materials and organic materials and have become an indispensable auxiliary aid in the fields of organic polymers, composite materials, automobiles, aviation, electronics, inks, coatings and construction.

The silane coupling agent molecule contains two different reactive groups, and its chemical structure can be represented by Y—R—SiX$_3$. In this formula, the reaction characteristics of X and Y are different; X is a group that can undergo a hydrolysis reaction and generate a silicon hydroxyl group (Si—OH), such as alkoxy, acetoxy, halogen, etc.; X has ability to bond with glass, silica, clay and some metals such as aluminum, iron, zinc and the like; Y is an organic group that reacts with the polymer to improve the reactivity and compatibility of the silane with the polymer, such as vinyl, amino, epoxy, mercapto, etc.; R is a carbon chain with a saturated or unsaturated bond that connects Y to the Si atom. Because containing in the molecule two kinds of functional groups, i.e., an organic-philic group and an inorganic-philic group, the silane coupling agent can be used as a "molecular bridge" connecting an inorganic material and an organic material. Two materials of different properties are connected to form an inorganic phase-silane coupling agent-organic phase bonded layer, thereby increasing the bonding force between the resin base and the inorganic filler, and also changing the melt flowability, crystallinity, color, etc.

In the modification formula of the polyphenylene sulfide resin, common fillers are mineral powder such as glass fiber and calcium carbonate. Silane coupling agents are also commonly used modification aids. However, in order to obtain better performance of the composite material, it is not enough to rely solely on the aids, the molecular modification of the polymer needs to be taken into consideration at the same time. On the basis of ensuring other excellent properties of polyphenylene sulfide, some properties, such as tensile strength, flexural strength or elongation at break, etc. are to be enhanced.

At present, the most mature industrialized production method of polyphenylene sulfide resin is synthesis by means of solution polycondensation at high temperature and high pressure using an alkali metal sulfide and a halogen-containing aromatic compound as raw materials. Where a polyphenylene sulfide is synthesized using an alkali metal sulfide and p-dichlorobenzene as raw materials, the terminal groups of the polyphenylene sulfide are mainly chlorine terminal groups and thiol terminal groups. Increasing the thiol terminal groups is conducive to improving the reactivity, but the chlorine terminal group is not reactive. To increase the ratio of thiol terminal groups, the most effective method is to increase the molar ratio of sulfide to p-dichlorobenzene in the polycondensation reaction, but a large number of nitrogen-containing terminal groups will be generated at this time, resulting in deteriorated color and thermal stability of the resin.

In order to improve the reactivity of the polyphenylene sulfide resin, the Japanese DIC company proposed in a patent CN201480018386.7 a method for producing a polyphenylene sulfide resin by melt polymerization of a mixture containing a diiodine compound, solid sulfur, and a sulfur-containing polymerization inhibitor. The terminal group of the polymerization inhibitor used is —COOX, that is, the patent obtains a polyphenylene sulfide resin having a terminal group of —COOH, which has excellent reactivity, by adding a polymerization inhibitor. This process uses solid sulfur as a sulfur source and obtains a polyphenylene sulfide resin by means of melt polycondensation. The molecular main chain of the polymer contains a certain number of disulfide bonds (—S—S—), which easily breaks at high temperatures, resulting in decreased thermal stability of the product. Besides, the terminal group can only be —COOH, which cannot be effectively adjusted, and as a result, it is difficult to adjust the reactivity of the product.

YU Zili et al. of Sichuan University (Macromolecular Chemistry and Physics, 1996, 197, 4061-4068) used sodium sulfide and p-dichlorobenzene as raw materials, hexamethylphosphoryltriamine as a solvent, to carry out dehydration and polycondensationto synthesize a polyphenylene sulfide, to which p-chlorobenzoic acid was added to replace the mercapto group with a carboxyl group to form a polyphenylene sulfide resin with a carboxyl group as a terminal group. However, the finished product was an oligomer, which is difficult to adapt to the requirements of subsequent modification applications.

REN Haohao et al. of Sichuan University (Composites Science and Technology, 2017, 146, 65-72) used sodium sulfide and dichlorobenzene as raw materials, to which 2,5-dichlorobenzoic acid was added, and carried out dehydration and polycondensation in N-methylpyrrolidone, to synthesize a polyphenylene sulfide having a branched carboxyl group on the molecular chain. Since its linear molecular structure is destroyed, the polyphenylene sulfide can only be used as a modifying additive.

SUMMARY

Problems to be Solved by the Disclosure

In order to solve the above-mentioned problems, according to the requirements of the modification formula for the reactivity and crystallization temperature of the polyphenylene sulfide resin, the disclosure provides a polyphenylene sulfide resin having high reactivity, high melting crystallization temperature and high thermal stability, and also provides a preparation method and application of the polyphenylene sulfide resin. In the disclosure, by adjusting the terminal-group adjusting agent, polyphenylene sulfide resins with different reactivity and melt crystallization temperatures are selectively and controllably prepared, and the polyphenylene sulfide resins also have excellent thermal stability. The polyphenylene sulfide resins have a wide application range.

Solution to the Problems

Provided is a method for preparing a polyphenylene sulfide resin, wherein a primary polyphenylene sulfide is used as a raw material, and a hydroxyl-containing aromatic thiol compound and 4-thiophenyl-thiophenol are used as terminal-group adjusting agents to perform a terminal-group adjusting reaction, so as to obtain the polyphenylene sulfide resin.

In said method for preparing a polyphenylene sulfide resin, the hydroxyl-containing aromatic thiol compound has a structure of HS—Ar—R—OH. Ar is an arylene group, preferably a phenylene group, and R is a carbon chain alkylene group or a carbon chain alkylene acyl group, which is selected from a linear structure or a branched structure, preferably a linear structure, and most preferably a C1-C4 linear carbon chain alkylene group or carbon chain alkylene acyl group. —R—OH and —HS form a para-, meta- or ortho-structure, preferably a para-structure, on a benzene ring.

The 4-thiophenyl-thiophenol has a structural formula

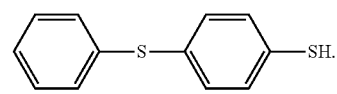

In said method for preparing a polyphenylene sulfide resin, based on 100 g of the primary polyphenylene sulfide, the hydroxyl-containing aromatic thiol compound is used in an amount of 0.01 to 0.04 mol, and 4-thiophenyl-thiophenol is used in an amount of 0.01 to 0.03 mol.

In said method for preparing a polyphenylene sulfide resin, the pH of the terminal-group adjusting reaction is 9 to 12, and the reaction solvent is N-methylpyrrolidone. The pH of the terminal-group adjusting reaction is adjusted by adding an alkaline substance, which preferably is sodium hydroxide or potassium hydroxide, and more preferably is sodium hydroxide; the amount of the reaction solvent N-methylpyrrolidone is not strictly required in particular, and is generally 3 to 6 times the mass of the primary polyphenylene sulfide resin.

In said method for preparing a polyphenylene sulfide resin, the reaction temperature of the terminal-group adjusting reaction is 250 to 280° C. Preferably, the primary polyphenylene sulfide resin and the hydroxyl-containing aromatic thiol compound are first dissolved in a part of the reaction solvent, and then the temperature is slowly raised to the reaction temperature, and the temperature is maintained for a period of time, and then 4-thiophenyl-thiophenol is added to continue the reaction while the temperature is maintained.

Preferably, the temperature slope is 1.0 to 3.0° C./min.

Preferably, the two periods of time for maintaining the temperature are 1 to 3 hours, respectively.

In said method for preparing a polyphenylene sulfide resin, after the terminal-group adjusting reaction is completed, the filtration is performed, the filter cake is washed until the pH of the filtrate is 6 to 8, and the filtered cake obtained after washing is dried to obtain a finished polyphenylene sulfide resin.

In said method for preparing a polyphenylene sulfide resin, the primary polyphenylene sulfide has a thermal stability index of 0.96 or more. Preferably, the primary polyphenylene sulfide is prepared by the following method: a polycondensation reaction is carried out using a sulfur-containing compound and p-dichlorobenzene as raw materials, separating the reaction solution by cooling, followed by washing and drying, to obtain the primary polyphenylene sulfide.

The sulfur-containing compound is selected from hydrosulfides, and is preferably sodium hydrosulfide or potassium hydrosulfide. Based on 1.0 mol of total sulfur, p-dichlorobenzene is used in an amount of 1.02 to 1.05 mol.

The water content in the reaction system of the polycondensation reaction is less than 0.5 mol/mol total sulfur.

The reaction solvent of the polycondensation reaction is N-methylpyrrolidone. Based on 1.0 mol of total sulfur, the total amount of the solvent is 5.5 to 6.0 mol.

The temperature of the polycondensation reaction is 220 to 280° C.

The washing comprises pickling and/or washing with water, and the filter cake is washed until the content of chloride ions remained in the filtrate is 0.01% or less. The pickling means washing the filter cake with hydrochloric acid, sulfuric acid and phosphoric acid, preferably hydrochloric acid. Based on 1.0 mol fatty acid, the acid is used in an amount of 1.1 to 1.2 mol.

For the preparation of the primary polyphenylene sulfide, preferably, the polycondensation reaction is carried out in the presence of a polycondensation aid. The polycondensation aid is an alkaline substance. More preferably, the polycondensation aid is an alkaline substance and a fatty acid.

The alkaline substance is selected from hydroxides of alkali metals, preferably NaOH or KOH, and more preferably NaOH. Based on 1.0 mol of total sulfur, the alkaline substance is used in an amount of 1.00 to 1.02 mol.

The fatty acid is selected from one or more of medium- and short-chain fatty acids, and is preferably one or more of C5-C6 fatty acids. Based on 1.0 mol total sulfur, the molar ratio of the fatty acid to the sulfur-containing compound is 0.8 to 1.0:1.

More preferably, the preparation of the primary polyphenylene sulfide specifically comprises the following steps:

1) adding an alkaline substance and a fatty acid to the solvent to perform a dehydration treatment;

2) adding a sulfur-containing compound to a dehydrated solution obtained in step 1) to perform a secondary dehydration operation;

3) adding p-dichlorobenzene and conducting a polycondensation reaction to obtain a reaction solution; and 4) separating the reaction solution by cooling, followed by washing and drying, to obtain the primary polyphenylene sulfide.

The temperatures for the dehydration and the secondary dehydration in step 1) and step 2) described above are 180 to 250° C. The secondary dehydration is performed until the water content in the reaction system is less than 0.5 mol/mol total sulfur.

The disclosure also relates to a polyphenylene sulfide resin, which has a thermal stability index of 0.95 or more, a reaction activity of 2.5 or more, and a melting crystallization temperature of 230 to 260° C. Preferably, the polyphenylene sulfide resin has a thermal stability index of 0.96 or more.

The disclosure also relates to use of a polyphenylene sulfide resin, which has a thermal stability index of 0.95 or more, a reaction activity of 2.5 or more, and a melting crystallization temperature of 230 to 260° C.

The polyphenylene sulfide resin is used in fields such as automobile parts, electronic/electrical equipment, chemical industry, and machinery industry.

The polyphenylene sulfide resin can also be used for the preparation of a modified resin. Preferably, the polyphenylene sulfide resin reacts with a coupling agent to prepare the modified resin. The coupling agent is not particularly limited, and preferably, the coupling agent is a silane coupling agent. The modified resin is used for hood interior parts of engines, brake systems and electronic/electrical equipment having high-temperature resistance, high dimensional stability, and corrosion resistance, as well as high-strength, temperature-resistant and corrosion-resistant material application fields such as precision gears, pistons, acid and alkali resistant valves, pipes and fittings, etc.

Advantageous Effects

The method for preparing a polyphenylene sulfide resin, and the polyphenylene sulfide resin prepared by the method of the disclosure have the following advantageous effects:

1) In the disclosure, a hydroxyl-containing aromatic thiol compound is used as one of the terminal-group adjusting agents, and its hydroxyl group is used to replace the chlorine terminal group of the primary polyphenylene sulfide to prepare a polyphenylene sulfide resin with a —R—OH type terminal group. The polyphenylene sulfide resin has a reactivity of 2.5 or more, and is suitable for the preparation of various types of modified resins, and is particularly suitable for reacting with a coupling agent to prepare a corresponding modified resin.

2) The polyphenylene sulfide resin provided by the disclosure has a melting crystallization temperature of 230 to 260° C. At its application temperature, the polyphenylene sulfide resin can achieve rapid crystallization, and have shorter crystallization time and production cycle during subsequent processing and utilization.

3) The polyphenylene sulfide resin provided by the disclosure has a thermal stability index of 0.95 or more in addition to high reactivity and high melting crystallization temperature, and the polyphenylene sulfide resin can be directly used for extrusion and injection molding, and has a wide application range.

4) The reactivity and the melting crystallization temperature of the polyphenylene sulfide resin provided by the disclosure are controllable. During the preparation, by adjusting the proportions of the two kinds of terminal-group adjusting agents, the reactivity and the melting crystallization temperature of the polyphenylene sulfide resin can be controlled such that the polyphenylene sulfide resin meets the requirements of related parameters for subsequent applications.

DETAILED DESCRIPTION

The following is a detailed description of the way of implementing the disclosure.

Embodiment 1

In this embodiment, the disclosure provides a method for preparing a polyphenylene sulfide resin, which uses a primary polyphenylene sulfide as a raw material, and performs terminal-group adjusting reaction using a hydroxyl-containing aromatic thiol compound and 4-thiophenyl-thiophenol as terminal-group adjusting agents in an alkaline condition, to prepare a polyphenylene sulfide resin.

Terminal-Group Adjusting Agent

In this embodiment of the disclosure, a hydroxyl-containing aromatic thiol compound and 4-thiophenyl-thiophenol are used as terminal-group adjusting agents of the polyphenylene sulfide and react with the primary polyphenylene sulfide to form a molecular terminal group structure terminated with —R—OH and a phenyl group. Here, the —R—OH terminal group is capable of improving the reactivity of the polyphenylene sulfide resin; the phenyl group can increase the melting crystallization temperature of the polyphenylene sulfide resin; meanwhile, both —R—OH and the phenyl group are capable of reducing the chlorine content in the polyphenylene sulfide resin.

In this embodiment of the disclosure, according to the different requirements of reactivity and melting crystallization temperature of the polyphenylene sulfide resin, the reactivity and melting crystallization temperature can be controlled by adjusting the addition proportion of the hydroxyl-containing aromatic thiol compound and the 4-thiophenyl-thiophenol. According to the method for preparing a polyphenylene sulfide resin of the disclosure, the control method is simple and highly controllable.

The aforesaid primary polyphenylene sulfide is obtained by performing a polycondensation reaction using a sulfur-containing compound and p-dichlorobenzene as raw materials, and subjecting the reaction solution to separation by cooling, washing and drying.

Sulfur-Containing Compound

In this embodiment of the disclosure, the sulfur-containing compound to be used is not particularly limited in principle, which may be, for example, a sulfur simple substance, an alkali metal sulfide, an alkali metal hydrosulfide, or the like generally used in the art. Furthermore, the inventors of the disclosure have found that, from the perspective of taking thermal stability into consideration, for example, in order to reduce the thermal stability deterioration caused by the presence of —S—S— in the polyphenylene sulfide structure, the sulfur-containing compound in this embodiment of the disclosure is preferably an alkali metal hydrosulfide, and the alkali metal is not limited in principle, but from the perspective of convenience of subsequent processing, sodium is preferable, that is, the sulfur-containing compound is preferably NaHS.

Polycondensation Reaction

In this embodiment of the disclosure, the main structure of polyphenylene sulfide is realized by a polycondensation reaction. There is no particular limitation on the manner or conditions in which the polycondensation reaction proceeds. For example, in a polycondensation reaction, under the reaction conditions generally used in the art, a condensation polymerization reaction is carried out between a sulfide-containing compound and p-dichlorobenzene Preferably, said polycondensation reaction uses an alkaline substance as a polycondensation aid. There is no particular limitation on the alkaline substance. Preferably, the alkaline substance is selected from NaOH or KOH, and more preferably NaOH. There is no special requirement for the form of adding the alkaline substance, which may be added directly or in the form of an aqueous solution.

More preferably, the polycondensation reaction uses an alkaline substance and a fatty acid as polycondensation aids. The use of a fatty acid as one of the polycondensation aids can effectively inhibit the formation of nitrogen-containing terminal groups in the primary polyphenylene sulfide. The fatty acid may be a fatty acid commonly used in the art. Preferably, the fatty acid may be short- and medium-chain fatty acid; more preferably, the fatty acid is a C5-C6 fatty acid. In particular, when a C5-C6 fatty acid is used as a polycondensation aid, the formation of nitrogen-containing terminal groups can be effectively controlled. Related research shows that the nitrogen-containing terminal groups come from side reaction involved by polar solvents (such as solvents with high boiling points such as NMP) in the reaction system, and the thermal stability of the polyphenylene sulfide resin can be effectively improved by reducing the content of the terminal-group nitrogen. Further, the C5-C6 fatty acid is preferably hexanoic acid, pentoic acid, isopentoic acid, 2-ethylbutyric acid and mixtures thereof in any proportion.

The polycondensation reaction needs to control the water content in the reaction system. Generally, the sulfur-containing compound is dehydrated to control the water content in the reaction system to be less than 0.5 mol/mol total sulfur. When an alkaline substance, or an alkaline substance and a fatty acid are used as polycondensation aids, it is preferable to first dehydrate the alkaline substance, or the alkaline substance and the fatty acid, and then add a sulfur-containing compound for secondary dehydration. This can reduce the loss of sulfur caused by the decomposition and side reactions of the sulfur-containing compound under long-term dehydration conditions.

In this embodiment of the disclosure, after the polycondensation reaction, the system is cooled to 155 to 180° C., and the subsequent separation treatment is performed at this temperature. Such a temperature level is higher than that of the prior art, because the inventors of the disclosure have found that the treatment at the above temperature can precipitate the primary polyphenylene sulfide (PPS) with a high molecular weight as much as possible while remaining PPS of which the reaction is insufficient and which has low molecular weight in the reaction solution, thereby reducing the nitrogen content in the final product, because the PPS with a low molecular weight contains more nitrogen.

Embodiment 2

The disclosure provided a polyphenylene sulfide resin, which has a thermal stability index of 0.95 or more, a reaction activity of 2.5 or more, and a melting crystallization temperature of 230 to 260° C. Preferably, the polyphenylene sulfide resin has a thermal stability index of 0.96 or more.

Thermal Stability

In the disclosure, the thermal stability is characterized by a thermal stability index.

In polyphenylene sulfide resin, the nitrogen content of the terminal group has an important influence on the thermal stability of the resin. The nitrogen content of the terminal group is brought about by the side reaction of the reaction solvent in the polycondensation reaction for preparing the primary polyphenylene sulfide. In the polycondensation reaction, a fatty acid is used as a polycondensation aid, especially a C5-C6 fatty acid is used as a polycondensation aid, which can effectively reduce the nitrogen content of the terminal group, and can significantly improve the thermal stability of the primary polyphenylene sulfide and the polyphenylene sulfide resin.

In order to more accurately characterize the thermal stability of the polyphenylene sulfide resin of the disclosure, the thermal stability index is measured as follows.

In the disclosure, the melt viscosity of polyphenylene sulfide is measured by an LCR7001 capillary rheometer manufactured by Dynisco company. During the measurement, the polymer sample is first introduced into the device, the temperature is set to 310° C. and maintained for a certain period of time, and then the melt viscosity is measured at a shear rate of 1216 $sec^{-1}$.

After the polymer sample is maintained at 310° C. for 5 minutes, the melt viscosity is measured at a shear rate of 1216 $sec^{-1}$, which is marked as $MV_1$; after the polymer sample is maintained at 310° C. for 30 minutes, the melt viscosity is measured at a shear rate of 1216 $sec^{-1}$, which is marked as $MV_2$. $MV_2/MV_1$ is just the thermal stability. The larger this ratio, the better the thermal stability of the polymer.

The polyphenylene sulfide resin of the disclosure has a thermal stability index of 0.95 or more, and preferably has a thermal stability index of 0.96 or more.

Crystallinity

In the disclosure, crystallinity is characterized by melting crystallization temperature.

In this embodiment of the disclosure, after the terminal groups of the primary polyphenylene sulfide are replaced by phenyl and —R—OH terminal groups, the steric hindrance of the terminal groups becomes smaller, the molecular chain regularity is enhanced, and the melting crystallization temperature and crystallization rate of the polyphenylene sulfide are increased, so that the polyphenylene sulfide resin according to the disclosure has the characteristics of high melting crystallization temperature and rapid crystallization.

In the prior art, there are many methods for measuring melting crystallization temperature. In order to more accurately characterize the crystallinity of the polyphenylene sulfide resin of the disclosure, it is preferable that the melting crystallization temperature is measured by the following measurement method.

Reactivity

In the disclosure, the reactivity is characterized by an activity index

In this embodiment of the disclosure, the —R—OH terminal group in the polyphenylene sulfide resin can make the polyphenylene sulfide resin have high reactivity, and meanwhile, the reactivity of the polyphenylene sulfide resin can be controlled according to the hydroxyl-containing aromatic thiol compound upon the terminal-group adjusting reaction. The polyphenylene sulfide resin can be well applied to resin modification. If polyphenylene sulfide resin is modified with a silane coupling agent, the —R—OH terminal group of the polyphenylene sulfide resin will react with groups such as epoxy group, amino group of the silane coupling agent during the modification process, thereby tightly combining the polymer with the inorganic phase via the silane coupling agent, so that the modified material obtains more excellent properties.

In order to more accurately characterize the reactivity of the polyphenylene sulfide resin of the disclosure, the activity index is measured as follows.

100 parts by mass of a PPS resin is mixed with 0.8 parts by mass of 3-(2,3-epoxypropoxy)propyltrimethoxysilane, and after homogeneous mixing, the melt viscosity is measured. A degree of viscosity increase is calculated by the melting viscosity after the addition of a coupling agent/the melting viscosity before the addition of a coupling agent. The greater the degree of viscosity increase, the higher the reactivity.

In addition, in principle, there are no limitations on the equipment used in this embodiment, as long as it can realize the reaction or treatment process described above.

DETAILED EXAMPLES

Hereinafter, the disclosure will be described more specifically by examples, but the disclosure is not limited to these examples.

In the disclosure, the physical properties and relevant characteristics are measured by the following methods.

(1) Measurement Method of Melt Viscosity

In the disclosure, the melt viscosity of polyphenylene sulfide is measured by an LCR7001 capillary rheometer manufactured by Dyniscocompany. During the measurement, the polymer sample is first introduced into the device, the temperature is set to 310° C. and maintained for 5 minutes, and then the melt viscosity is measured at a shear rate of 1216 $sec^{-1}$.

(2) Measurement of Thermal Stability

After the polymer sample is maintained at 310° C. for 5 minutes, the melt viscosity is measured at a shear rate of 1216 $sec^{-1}$, which is marked as $MV_1$; After the polymer sample is maintained at 310° C. for 30 minutes, the melt viscosity is measured at a shear rate of 1216 $sec^{-1}$, which is marked as $MV_2$. $MV_2/MV_1$ is just the thermal stability. The larger this ratio, the better the thermal stability of the polymer.

(3) Measurement Method of Nitrogen Content

The nitrogen content of PPS is measured with a trace sulfur and nitrogen analyzer.

(4) Measurement Method of Crystallization Temperature

A DSC instrument manufactured by TA Co., Ltd. of the United States is used, the sample amount is about 5 mg. Under a nitrogen environment, the temperature is raised from 0° C. to 340° C. at 20° C./min and maintained for 5 minutes, and then cooled down to 0° C. at 10° C./min. The peak crystallization temperature during the cooling process is the crystallization temperature $T_{c2}$.

(5) Measurement Method of Reactivity 100 parts by mass of a PPS resin is mixed with 0.8 parts by mass of 3-(2,3-epoxypropoxy)propyltrimethoxysilane, and after homogeneous mixing, the melt viscosity is measured according to the measurement of melt viscosity described above. A degree of viscosity increase is calculated by the melting viscosity after the addition of a coupling agent/the melting viscosity before the addition of a coupling agent. The greater the degree of viscosity increase, the higher the reactivity.

(6) Total Sulfur

In the examples, the total sulfur before dehydration is the sulfur content in the fed NaHS, and the total sulfur after dehydration is the sulfur content in the fed NaHS minus the sulfur loss in the dehydration, i.e.,

[total sulfur before dehydration]=[sulfur content in the fed NaHS]

[total sulfur after dehydration]=[sulfur content in the fed NaHS]−[sulfur loss in the dehydration].

(7) Total Amount of the Alkaline Substance

In the examples, NaOH was preferably used as the alkaline substance. Therefore, the total amount of the alkaline substance is the total NaOH amount.

The total NaOH amount is the sum of the fed NaOH minus the NaOH required for the aid reaction, plus the NaOH produced by dehydration, i.e.,

[total NaOH amount]=[the fed NaOH required for the aid reaction]+[NaOH produced by dehydration].

The preparation processes of the primary polyphenylene sulfides of the disclosure (hereinafter, referred to as PPS-1, PPS-2, PPS-3) are as follows.

a. Preparation of PPS-1

In a 150 L reactor, 34.91 kg (350.0 mol) of N-methylpyrrolidone (NMP), 14.34 kg (179.2 mol) of 50% aqueous sodium hydroxide solution and 8.19 kg (80.0 mol) of isopentoic acid were added, and heated up to 100° C. at a rate of 1.5° C./min under a stirring speed of 200 rpm and nitrogen protection, insulated for 2 hours; after the insulation, the system was warmed up to 190° C. at a rate of 1.5° C./min to remove 8.89 kg of aqueous solution (96.84% water content), and then cooled down to 110° C. 11.22 Kg (100.0 mol) 50% sodium hydrosulfide and 9.98 kg (100.0 mol) of NMP were added and heated to 180° C. at a rate of 1.5° C./min at the same stirring speed to remove 5.69 kg of aqueous solution (89.46% water content), and cooled down to 150° C. after dehydration. At this time, the amount of total sulfur in the system was 99.0 mol, the water content was 49.0 mol, and the molar ratio of total NaOH/total sulfur was 1.01.

In the above reactor, 14.70 kg (101.0 mol) of p-dichlorobenzene (PDCB) and 10.89 kg (110.0 mol) of NMP were added, and the molar ratio of PDCB/total sulfur was 1.02. The temperature was raised to 220° C. in about 1 hour and maintained for 3 hours; then, the temperature was raised to 260° C. at a rate of 1.0° C./min, and maintained for 1 hour. After the insulation, the temperature was lowered to 155° C. in about 1 hour. The contents in the reactor were centrifuged and spin-dried. The filter cake was rinsed with 30.0 kg of 155° C. NMP, spin-dried, and then rinsed with 30 kg of a hydrochloric acid solution (96.0 mol) and spin-dried. The filtrates were combined and subject to azeotropic distillation to recover 8.11 kg of isopentoic acid, followed by vacuum distillation to recover 84.2 kg of NMP.

The filter cake rinsed above was washed with deionized water for several times, and the washed filter cake was dried to obtain a white polyphenylene sulfide resin PPS-1, of which the mass yield was 93.5%, the melt viscosity was 95 Pa·s, the nitrogen content was 450 ppm, the thermal stability was 0.967, the reactivity was 1.59, and the crystallization temperature was 202° C.

b. Preparation of PPS-2

In a 150 L reactor, 39.90 kg (400.0 mol) of NMP, 18.78 kg (187.8 mol) of 40% aqueous sodium hydroxide solution and 10.44 kg (90.0 mol) of hexanoic acid were added, and heated up to 90° C. at a rate of 1.0° C./min under a stirring speed of 200 rpm and nitrogen protection, insulated for 3 hours; after the insulation, the system was warmed up to 180° C. at a rate of 1.0° C./min to remove 13.14 kg of aqueous solution (98.10% water content), and then cooled down to 130° C. 11.22 Kg (100.0 mol) 50% sodium hydrosulfide and 4.99 kg (50.0 mol) of NMP were added and heated to 200° C. at a rate of 0.7° C./min at the same stirring speed to remove 5.76 kg of aqueous solution (91.79% water content), and cooled down to 140° C. after dehydration. At this time, the amount of total sulfur in the system was 98.9 mol, the water content was 27.8 mol, and the molar ratio of total NaOH/total sulfur was 1.00.

In the above reactor, 14.99 kg (102.0 mol) of PDCB and 12.96 kg (130.0 mol) of NMP were added, and the molar ratio of PDCB/total sulfur was 1.03. The temperature was raised to 240° C. in about 1.5 hours and maintained for 0.5 hour; then, the temperature was raised to 280° C. at a rate of 1.5° C./min, and maintained for 4 hours. After the insulation, the temperature was lowered to 180° C. in about 2 hours. The contents in the reactor were centrifuged and spin-dried. The filter cake was rinsed with 30.0 kg of 180° C. NMP, spin-dried, and then rinsed with 30.0 kg of a hydrochloric acid solution (100 mol) and spin-dried. The filtrates were combined and subject to azeotropic distillation to recover 10.38 kg of hexanoic acid, followed by vacuum distillation to recover 86.8 kg of NMP.

The filter cake rinsed above was washed with deionized water for several times, and the washed filter cake was dried to obtain a white polyphenylene sulfide resin PPS-2, of which the mass yield was 93.6%, the melt viscosity was 64 Pa·s, the nitrogen content was 430 ppm, the thermal stability was 0.973, the reactivity was 1.53, and the crystallization temperature was 207° C.

c. Preparation of PPS-3

In a 150 L reactor, 44.89 kg (450.0 mol) of NMP, 15.15 kg (189.4 mol) of 50% aqueous sodium hydroxide solution and 10.20 kg (100.0 mol) of pentoic acid were added, and heated up to 120° C. at a rate of 2.0° C./min under a stirring speed of 200 rpm and nitrogen protection, insulated for 1 hour; after the insulation, the system was warmed up to 200° C. at a rate of 2.0° C./min to remove 9.76 kg of aqueous solution (96.07% water content), and then cooled down to 120° C. 11.22 Kg (100.0 mol) 50% sodium hydrosulfide and 4.99 kg (50.0 mol) of NMP were added and heated to 250° C. at a rate of 1.0° C./min at the same stirring speed to remove 5.56 kg of aqueous solution (92.57% water content), and cooled down to 160° C. after dehydration. At this time, the amount of total sulfur in the system was 98.7 mol, the water content was 25.5 mol, and the molar ratio of total NaOH/total sulfur was 1.02.

In the above reactor, 15.23 kg (103.6 mol) of PDCB and 10.77 kg (108.0 mol) of NMP were added, and the molar ratio of PDCB/total sulfur was 1.05. The temperature was raised to 230° C. in about 1 hour and maintained for 2 hours; then, the temperature was raised to 270° C. at a rate of 1.2° C./min, and maintained for 3 hours. After the insulation, the temperature was lowered to 160° C. in about 1 hour. The contents in the reactor were centrifuged and spin-dried. The filter cake was rinsed with 30.0 kg of 160° C. NMP, spin-dried, and then rinsed with 30.0 kg of a 10% hydrochloric acid solution (110 mol) and spin-dried. The filtrates were combined and subject to azeotropic distillation to recover 10.12 kg of pentoic acid, followed by vacuum distillation to recover 90.3 kg of NMP.

The filter cake rinsed above was washed with deionized water for several times, and the washed filter cake was dried to obtain a white polyphenylene sulfide resin PPS-3, of which the mass yield was 94.3%, the melt viscosity was 31 Pa·s, the nitrogen content was 410 ppm, the thermal stability was 0.983, the reactivity was 1.51, and the crystallization temperature was 210° C.

Preparation of Polyphenylene Sulfide Resin

Example 1

In a 10 L reactor, 1000 g PPS-1, 0.1 mol p-hydroxylmethyl benzene thiol, 16 g NaOH and 3000 g NMP were added and heated to 260° C. at a rate of 1.0° C./min, under a stirring speed of 200 rpm and nitrogen protection, insulated for 1 hour; then, 0.3 mol 4-thiophenyl-thiophenol and 200 g NMP were added and insulated for 3 hours. After the insulation, the temperature was lowered to 160° C. in about 1 hour. The contents in the reactor were centrifuged and spin-dried. The filter cake was washed with deionized water for several times, and the washed filter cake was dried to obtain a white polyphenylene sulfide resin, of which the mass yield was 98.7%, the melt viscosity was 99 Pa·s, the nitrogen content was 440 ppm, the thermal stability was 0.965, the reactivity was 2.6, and the crystallization temperature was 242° C.

Example 2

In a 10 L reactor, 1000 g PPS-1, 0.4 mol p-hydroxylmethylbenzenethiol, 40 g NaOH and 5000 g NMP were added and heated to 280° C. at a rate of 1.5° C./min, under a stirring speed of 200 rpm and nitrogen protection, insulated for 3 hours; then, 0.2 mol 4-thiophenyl-thiophenol and 200 g NMP were added and insulated for 2 hours. After the insulation, the temperature was lowered to 140° C. in about 2 hours. The contents in the reactor were centrifuged and spin-dried. The filter cake was washed with deionized water for several times, and the washed filter cake was dried to obtain a white polyphenylene sulfide resin, of which the mass yield was 98.3%, the melt viscosity was 100 Pa·s, the nitrogen content was 430 ppm, the thermal stability was 0.961, the reactivity was 3.1, and the crystallization temperature was 236° C.

Example 3

In a 10 L reactor, 1000 g PPS-1, 0.3 mol p-hydroxylpropylbenzenethiol, 28 g NaOH and 4000 g NMP were added and heated to 270° C. at a rate of 1.5° C./min, under a stirring speed of 200 rpm and nitrogen protection, insulated for 2 hours; then, 0.1 mol 4-thiophenyl-thiophenol and 200 g NMP were added and insulated for 1 hour. After the insulation, the temperature was lowered to 150° C. in about 1.5 hours. The contents in the reactor were centrifuged and spin-dried. The filter cake was washed with deionized water for several times, and the washed filter cake was dried to obtain a white polyphenylene sulfide resin, of which the mass yield was 98.5%, the melt viscosity was 97 Pa·s, the nitrogen content was 440 ppm, the thermal stability was 0.963, the reactivity was 2.8, and the crystallization temperature was 232° C.

Example 4

In a 10 L reactor, 1000 g PPS-2, 0.1 mol p-hydroxylethylbenzenethiol, 16 g NaOH and 3000 g NMP were added and heated to 260° C. at a rate of 1.0° C./min, under a stirring speed of 200 rpm and nitrogen protection, insulated for 1 hour; then, 0.3 mol 4-thiophenyl-thiophenol and 200 g NMP were added and insulated for 3 hours. After the insulation, the temperature was lowered to 160° C. in about 1 hour. The contents in the reactor were centrifuged and spin-dried. The filter cake was washed with deionized water for several times, and the washed filter cake was dried to obtain a white polyphenylene sulfide resin, of which the mass yield was 98.7%, the melt viscosity was 62 Pa·s, the nitrogen content was 420 ppm, the thermal stability was 0.969, the reactivity was 2.7, and the crystallization temperature was 240° C.

Example 5

In a 10 L reactor, 1000 g PPS-3, 0.4 mol p-hydroxylpropylbenzenethiol, 24 g NaOH and 5000 g NMP were added and heated to 280° C. at a rate of 1.5° C./min, under a stirring speed of 200 rpm and nitrogen protection, insulated for 3 hours; then, 0.2 mol 4-thiophenyl-thiophenol and 200 g NMP were added and insulated for 2 hours. After the insulation, the temperature was lowered to 140° C. in about 2 hours. The contents in the reactor were centrifuged and spin-dried. The filter cake was washed with deionized water for several times, and the washed filter cake was dried to obtain a white polyphenylene sulfide resin, of which the mass yield was 98.3%, the melt viscosity was 36 Pa·s, the nitrogen content was 390 ppm, the thermal stability was 0.971, the reactivity was 3.3, and the crystallization temperature was 235° C.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for preparing a polyphenylene sulfide resin, wherein a primary polyphenylene sulfide is used as a raw material, and a hydroxyl-containing aromatic thiol compound and 4-thiophenyl-thiophenol are used as terminal-group adjusting agents to perform a terminal-group adjusting reaction, so as to obtain the polyphenylene sulfide resin, wherein the hydroxyl-containing aromatic thiol compound has a structure of:

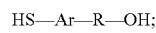

wherein Ar is a phenylene group; and
R is a carbon chain alkylene group or a carbon chain alkylene acyl group, which is selected from a linear structure or a branched structure; and —R—OH and —SH form a para-, meta- or ortho structure on a benzene ring.

2. The method for preparing the polyphenylene sulfide resin according to claim 1, wherein R is a C1-C4 linear carbon chain alkylene group or carbon chain alkylene acyl group.

3. The method for preparing the polyphenylene sulfide resin according to claim 1, wherein based on 100 g of the primary polyphenylene sulfide, the hydroxyl-containing aromatic thiol compound is used in an amount of 0.01 to 0.04 mol, and 4-thiophenyl-thiophenol is used in an amount of 0.01 to 0.03 mol.

4. The method for preparing the polyphenylene sulfide resin according to claim 1, wherein the terminal-group adjusting reaction has a pH of 9 to 12 and a reaction temperature of 250 to 280° C., and wherein a reaction solvent of the terminal-group adjusting reaction is N-methylpyrrolidone.

5. The method for preparing the polyphenylene sulfide resin according to claim 4, wherein after the terminal-group adjusting reaction is completed, a filtration is performed, a filter cake is washed until a filtrate has a pH of 6 to 8, and the filter cake obtained after washing is dried to obtain a finished polyphenylene sulfide resin.

6. The method for preparing the polyphenylene sulfide resin according to claim 1, wherein the primary polyphenylene sulfide has a thermal stability index of 0.96 or more.

7. The method for preparing the polyphenylene sulfide resin according to claim 6, wherein the primary polyphenylene sulfide is obtained by the following method: performing a polycondensation reaction using a sulfur-containing compound and p-dichlorobenzene as raw materials, and separating a reaction solution by cooling, followed by washing and drying, to obtain the primary polyphenylene sulfide.

8. The method for preparing the polyphenylene sulfide resin according to claim 7, wherein the sulfur-containing compound is a hydrosulfide selected from the group consisting of sodium hydrosulfide, potassium hydrosulfide and mixtures thereof.

9. The method for preparing the polyphenylene sulfide resin according to claim 7, wherein based on 1.0 mol of total sulfur, p-dichlorobenzene is used in an amount of 1.02 to 1.05 mol.

10. The method for preparing the polyphenylene sulfide resin according to claim 7, wherein a reaction solvent of the polycondensation reaction is N-methylpyrrolidone, the total amount of the solvent is 5.5 to 6.0 mol based on 1.0 mol of total sulfur, and a reaction system of the polycondensation reaction has a water content of less than 0.5 mol/mol total sulfur.

11. The method for preparing the polyphenylene sulfide resin according to claim 7, wherein the temperature of the polycondensation reaction is 220 to 280° C.

12. The method for preparing the polyphenylene sulfide resin according to claim 7, wherein the washing comprises pickling and/or washing with water, and the filter cake is washed until a content of chloride ions remained in the filtrate is 0.01% or less.

13. The method for preparing the polyphenylene sulfide resin according to claim 12, wherein the pickling step comprises washing the filter cake with an acid selected from the group consisting of hydrochloric acid, sulfuric acid, phosphoric acid and mixtures thereof, wherein the acid is used in an amount of 1.1 to 1.2 mol based on 1.0 mol fatty acid.

14. The method for preparing the polyphenylene sulfide resin according to claim 7, wherein the polycondensation reaction is carried out in the presence of a polycondensation aid; and the polycondensation aid is an alkaline substance.

15. The method for preparing the polyphenylene sulfide resin according to claim 14, wherein the alkaline substance is selected from hydroxides of alkali metals; based on 1.0 mol of total sulfur, the alkaline substance is used in an amount of 1.00 to 1.02 mol; the fatty acid is selected from one or more of medium- and short-chain fatty acids; and a molar ratio of the fatty acid to the sulfur-containing compound is 0.8 to 1.0:1.

16. The method for preparing the polyphenylene sulfide resin according to claim 14, wherein a preparation of the primary polyphenylene sulfide specifically comprises the following steps:
1) adding an alkaline substance and a fatty acid to the solvent to perform a dehydration treatment;
2) adding the sulfur-containing compound to a dehydrated solution obtained in step 1) to perform a secondary dehydration;
3) adding p-dichlorobenzene and conducting a polycondensation reaction to obtain a reaction solution; and
4) separating the reaction solution by cooling, followed by washing and drying, to obtain the primary polyphenylene sulfide.

17. The method for preparing the polyphenylene sulfide resin according to claim 16, wherein the temperatures for the dehydration and the secondary dehydration in step 1) and step 2) are 180 to 250° C.; and the secondary dehydration is performed until the water content in the reaction system is less than 0.5 mol/mol total sulfur.

18. The method for preparing the polyphenylene sulfide resin according to claim 8, wherein the sulfur-containing compound is selected from the groups consisting of sodium hydrosulfide, potassium hydrosulfide and mixtures thereof.

19. The method for preparing the polyphenylene sulfide resin according to claim 13, wherein the pickling step comprises washing the filter cake with hydrochloric acid in an amount of 1.1 to 1.2 mol based on 1.0 mol fatty acid.

20. The method for preparing the polyphenylene sulfide resin according to claim 15, wherein the alkaline substance is NaOH or KOH; based on 1.0 mol of total sulfur, the alkaline substance is used in an amount of 1.00 to 1.02 mol; and the fatty acid is selected the group consisting of C5-C6 fatty acids; and a molar ratio of the fatty acid to the sulfur-containing compound is 0.8 to 1.0:1.

* * * * *